V. A. CHERRY.
CHILD'S BICYCLE SEAT.
APPLICATION FILED NOV. 21, 1919.

1,350,987.

Patented Aug. 24, 1920.

Inventor
Verner A. Cherry,
H. M. Plaisted,
Attorney.

UNITED STATES PATENT OFFICE.

VERNER A. CHERRY, OF GRANITE CITY, ILLINOIS.

CHILD'S BICYCLE-SEAT.

1,350,987.  Specification of Letters Patent.  Patented Aug. 24, 1920.

Application filed November 21, 1919. Serial No. 339,763.

*To all whom it may concern:*

Be it known that I, VERNER A. CHERRY, a citizen of the United States, residing at Granite City, in the county of Madison and State of Illinois, have invented certain new and useful Improvements in Children's Bicycle-Seats, of which the following is a specification.

This invention relates to certain new and useful improvements in children's bicycle seats, the peculiarities of which will be hereinafter described and claimed.

The main object of my invention is to provide a seat for a child, carried on the backbone of a bicycle in addition to the usual seat for the driver, which child's seat can be readily folded or turned from horizontal to vertical when not needed for the child, and yet may be quickly turned into the desired position; secondly, to provide a seat that will shorten the height from the pedals, and thus enable an older child or one with short legs, to drive the wheel, and even without removing the usual seat.

It is often desired to take a child upon a bicycle in front of the driver or one pedaling the machine, and it is necessary to provide some kind of seat that usually takes time and trouble to mount upon the handle bars or backbone of the machine. My device is adapted to remain permanently upon the machine, and when not required for carrying a child it is folded up, or turned to a vertical position with regard to the seat, so that it is compact and takes up little space. At the same time it can be opened out in a couple of seconds to form a seat for supporting comfortably a child or youth; it can also be used by a youth whose legs are not long enough to reach the pedals when he occupies the driver's seat, but by my device he is brought near enough to the pedals to operate them efficiently, and the other seat is not necessarily removed from the machine.

Figure 3:
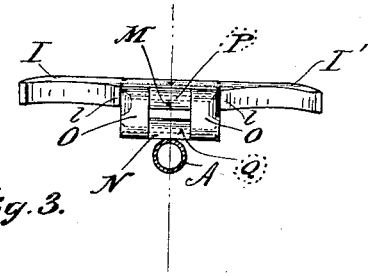
Figure 4:
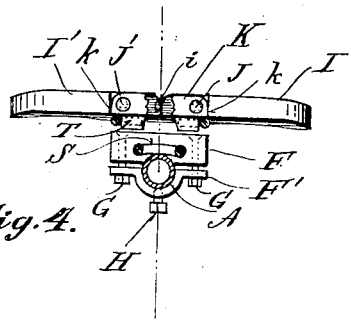
Figure 2:
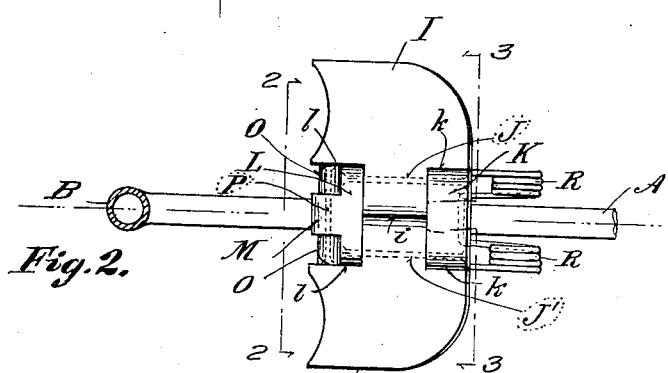
Figure 1:
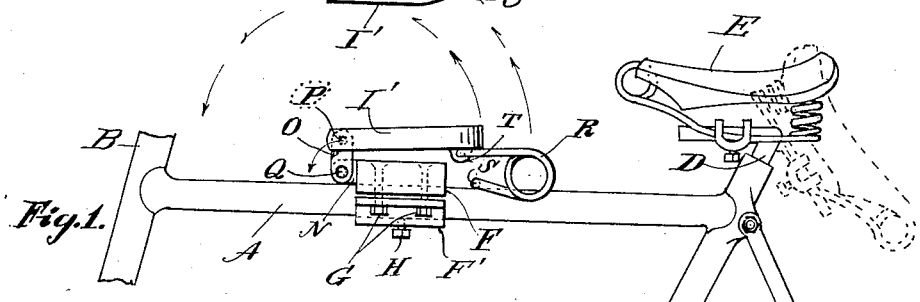
Figure 5:
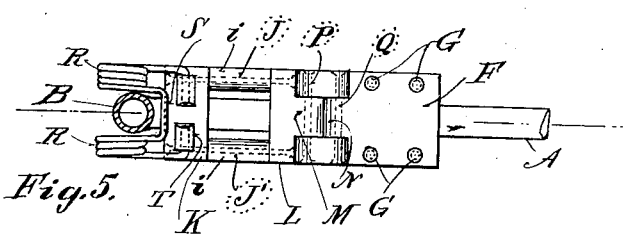

In the accompanying drawing on which like reference letters indicate corresponding parts, Figure 1 represents a side elevation of a portion of a bicycle frame with driver's seat, and my child's seat mounted on the frame in position for use; Fig. 2, a plan view of my device and portion of the frame carrying it; Fig. 3, an end elevation from the front, with section of the backbone on the line 2—2 of Fig. 2; Fig. 4, a rear end elevation with section of the backbone and spring on the line 3—3 of Fig 2; Fig. 5, a plan view of my device with the seat turned vertically and forward of its supporting member that is secured to the backbone of the frame; and Fig. 6 a side view of such device corresponding to the plan view of Fig. 5.

The letter A designates the backbone of a bicycle frame connecting the head post B and rear post C in which is mounted the seat post D that carries the usual seat E occupied by the driver of the machine. As applied to such a machine, I have illustrated my child's seat comprising a supporting member, which in this case consists of a two-part clamp F—F' connected by bolts G in order to grip the backbone firmly in any adjusted position. In addition to the clamping effect, I prefer to use a set screw H mounted in the lower clamp F' and engaging the backbone to prevent any chance of rotation of the supporting member.

The seat proper is preferably in two parts I—I', the meeting edges *i* being located in the central plane of the frame, and rounded at the top face and square at the lower face, Figs. 2 and 4, or otherwise adapted to lock against rotation in one direction while allowing rotation in the other direction, about horizontal pivots J—J' passing through adjacent portions of each half seat near the meeting edges *i*. These pivot bolts or pins are connected by a rear strap or piece K, and a front strap or piece L, which maintain the pivots parallel and resist the strain of the locking edges *i* under the weight of the child; the two seat parts are preferably formed with shoulders, *k—l*, opposite the respective strap ends, and said shoulders are likewise adapted to engage the ends of the straps K and L on the opposite side of the pivot connections J and J' from the meeting points or edges *i*, so as also to lock the seat against downward movement. Other locking means may however be employed.

The front strap L, has a leg M extending forward from the T-portion of the strap and in this leg is mounted a pivot pin or bolt for hinged connection on a horizontal transverse axis with the supporting clamping member before mentioned, and preferably by connection with the upper member F which has a tongue N in line with the leg M of the front strap. The connection between this front strap and the supporting member, is made by a pair of links O, pivoted at their respective ends to the leg M and the tongue N, by the pivot pins P and Q respectively. Said links stand vertically when the seat is in its position for use as shown in Figs. 1 and 2, and fit on both sides of the leg M and tongue N, and extend outward laterally to the ends of the arms of the strap L, so as to be engaged by the said shoulders *l* of each seat half and form an additional locking engagement to resist the downward movement of the horizontal seat when in operative position. The links also support the front edge of the seat halves, and the back of the seat may rest directly upon the supporting clamp, but is preferably cushioned by a double coil spring that is formed in one piece, with the coils R connected by the loop S while the ends of the spring engage sockets or eyes T on the underside of the rear strap. The loop S is adapted to rest upon the backbone A of the frame, and the space between the coils R gives room for the backbone in the up and down motion of the spring coils when the seat is in use. Any other form of spring or cushion effect may be given to the seat, and at other point of connection than the rear as herein shown, but this construction gives a spring effect to the child's seat at the point most effective for cushioning, and allows of temporary engagement with the backbone, or any other point of support for the seat in operative position.

Figure 6:
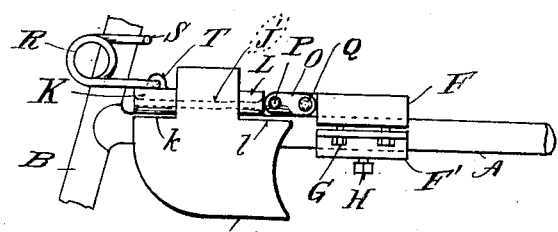

When it is desired to turn this seat from its horizontal to a vertical position the seat parts are rotated about a half circle as indicated by the arrows in Fig. 1, about the hinged connection with the clamping member, and this will bring the seat down upon the backbone near the head post B, with the coils R of the spring on opposite sides of the head post as shown in Figs. 5 and 6. No downward rotation of the seat halves can be made until such rotation is effected, and the links in this form of hinge are turned to a horizontal as in Fig. 6. Then the seat halves can be turned about the paralled horizontal pivots J—J' into a vertical position, as shown in Figs. 5 and 6. The portion of the straps K and L at the lateral ends, and also the outer and underside of the links O—O in the thrown-out or forward position of Figs. 5 and 6, are rounded as indicated, to allow of this vertical adjustment of the seat halves and secure the compact arrangement shown.

The device as shown in non-operative position therefore takes up very little space, and the seat being turned vertically is also out of the way of accidental engagement. When however, the seat is required for use, the seat halves are first turned to a horizontal position from the vertical position shown in Fig. 6; then the seat as a whole is rotated backward in a half circle about the hinge connection with the supporting clamp, until the seat is reversed and the spring engages with the frame of the machine. As shown in Fig. 1 the spring is tensioned as it normally appears when the seat is depressed by the weight of a child thereon, while still subject to further depression to give the cushioning effect required.

Another use to which my device is adapted, is that of supplying a seat closer to the pedals than the regular seat E, so that a youth whose legs are not long enough to occupy the regular seat, may use my device. This is done by shifting my device backward toward the seat post, after the seat E is reversed as indicated by dotted lines Fig. 1. On account of the angular construction of the seat post D, a rotation of this post half way around will bring the seat E to the rear and downward, and leave ample space to shift the child's seat backward on the backbone and bring it over the pedals. A person with short legs can therefore use this child's seat in comfort and pedal the machine.

I claim:

1. A device of the character described comprising a supporting member, a horizontal seat in two parts, independent parallel pivots for the adjacent portions of each part for vertical adjustment of said seat, strap connections for said pivots, and a hinge connection between one of said straps and the supporting member.

2. A device of the character described comprising a supporting member, a horizontal seat in two parts, independent parallel pivots for adjacent portions of said seats for vertical adjustment, straps connecting said pivots,—one strap having also a leg for pivotal connection at right angles to the arms of the strap,—and means to effect a pivot engagement between said leg and the supporting member.

3. A device of the character described comprising a supporting member, a horizontal seat in two parts, straps and pivots connecting said seat parts, and links pivoted to one of said straps and to the supporting member respectively, forming a double-pivoted hinge connection,—the seat parts having shoulders adapted to lock with said hinge connection substantially as described.

4. A device of the character described comprising a supporting member, a horizontal seat in two parts, independent parallel pivot connections for the meeting portions of said seat parts, straps connecting said pivots, a hinge connection between one of said straps and said supporting member, and a spring operatively engaging the other strap, substantially as described.

5. The combination with the backbone of a bicycle of a clamp adjustably mounted on said backbone and formed for horizontal hinge connection transverse to the backbone, a horizontal seat in two parts, formed for horizontal hinge connection parallel to the backbone, means to effect said hinge connection in both directions, and locking means for maintaining said seat parts horizontal till rotated on said transverse hinge connection.

6. The combination with the backbone of a bicycle, of a device of the character described comprising a clamp mounted on the backbone, a seat located above said clamp, means to hinge the front of said seat transversely to said clamp at the front end whereby the seat may be thrown forward in a half circle, and a spring having two coils spaced apart for spanning the backbone and having a connecting cross piece for engaging the backbone in normal position, and operatively engaged to the rear of said seat, whereby said spring will be thrown forward with the seat and span the head post of said bicycle, substantially as described.

In testimony whereof I have affixed my signature.

VERNER A. CHERRY.